United States Patent [19]

Kievit et al.

[11] 3,715,725

[45] Feb. 6, 1973

[54] ADDRESS RESPONSIVE CONTROLLER FOR COMPUTER HANDLING OF PERIPHERAL EQUIPMENT

[75] Inventors: James M. Kievit, Des Plaines; James L. Howe, Chicago, both of Ill.

[73] Assignee: A. B. Dick Company, Chicago, Ill.

[22] Filed: Jan. 11, 1971

[21] Appl. No.: 105,241

[52] U.S. Cl. ..................340/147, 340/152, 340/163

[51] Int. Cl. .......H04q 5/00, H04q 9/00, H04q 11/00

[58] Field of Search ......................340/152, 163, 147

[56] References Cited

UNITED STATES PATENTS

| | | | |
|---|---|---|---|
| 3,181,121 | 4/1965 | Losch | 340/152 X |
| 3,296,371 | 1/1967 | Fox | 340/152 X |
| 3,296,597 | 1/1967 | Scantlin | 340/152 X |
| 3,359,541 | 12/1967 | Hunkins | 340/152 |
| 3,413,606 | 11/1968 | Cichanowicz | 340/163 |
| 3,444,520 | 5/1969 | Messersmith | 340/163 |
| 3,576,539 | 4/1971 | Huber | 340/152 |

*Primary Examiner*—Harold I. Pitts
*Attorney*—Lindenberg, Feilich & Wasserman

[57] ABSTRACT

A system is provided for enabling a computer to communicate efficiently with a larger number of peripheral devices than provided for by the computer design and construction. The computer first addresses a controller which in turn addresses peripheral devices.

9 Claims, 7 Drawing Figures

INVENTORS
JAMES M. KIEVIT
JAMES L. HOWE
BY Lindenberg, Freilich & Wasserman
ATTORNEYS INVENTORS
JAMES M. KIEVIT
HOWE
BY Lindenberg, Freilich & Wasserman
ATTORNEYS INVENTORS
JAMES M. KIEVIT
JAMES L. HOWE
BY Lindenberg, Freilich & Wasserman
ATTORNEYS INVENTORS
JAMES M. KIEVIT
JAMES L. HOWE
BY Lindenberg, Freilich & Wasserman
ATTORNEYS

ADDRESS RESPONSIVE CONTROLLER FOR COMPUTER HANDLING OF PERIPHERAL EQUIPMENT

BACKGROUND OF THE INVENTION

This invention relates to arrangements for coupling peripheral devices to a computer for enabling two-way communication therebetween, and more particularly to improvements therein.

Present day information handling systems or computers are designed to function with possibly a dozen peripheral devices. They usually constitute the input devices such as paper tape or punch card readers, typewriters, auxiliary memory, and the output devices comprising display consoles and output printers. Where it is desired to extend the number of devices to which the computer can be connected for the purpose of both sending data thereto and receiving data therefrom, there appears to be a limit determined by the computer construction.

OBJECTS AND SUMMARY OF THE INVENTION

An object of this invention is to provide a circuit arrangement whereby the number of peripheral devices with which a computer may communicate is extended beyond the capabilities of the computer design and construction.

Yet another object of this invention is the provision of a novel communication arrangement between a computer and peripheral devices.

It is a further object of this invention to reduce the amount of controller logic required by each individual peripheral device accomplishing the latter by combining the common controller functions of a number of peripheral devices.

Still another object of this invention is to provide an efficient system for addressing and accessing a specific one of a plurality of computer peripheral devices.

These and other objects of the invention may be achieved by a system wherein for each group of peripheral devices to be controlled there is provided a controller circuit, which is positioned adjacent to computer. Each peripheral device has a party line interface circuit which is positioned adjacent the peripheral device to be controlled. The controller and the party line interface circuit are connected by busses.

The computer outputs two addresses. One is the address of a controller connected to a desired peripheral device and the second is the address of the desired peripheral device. The controller addressed receives data from the computer and holds it until the addressed peripheral device is ready to receive the data at which time the data is sent to the addressed peripheral device. Provision is also made to send instructions to the peripheral device to instruct it to operate in a desired mode. Provision is also made for enabling an addressed peripheral device to send data back to the computer through the interface and controller apparatus.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
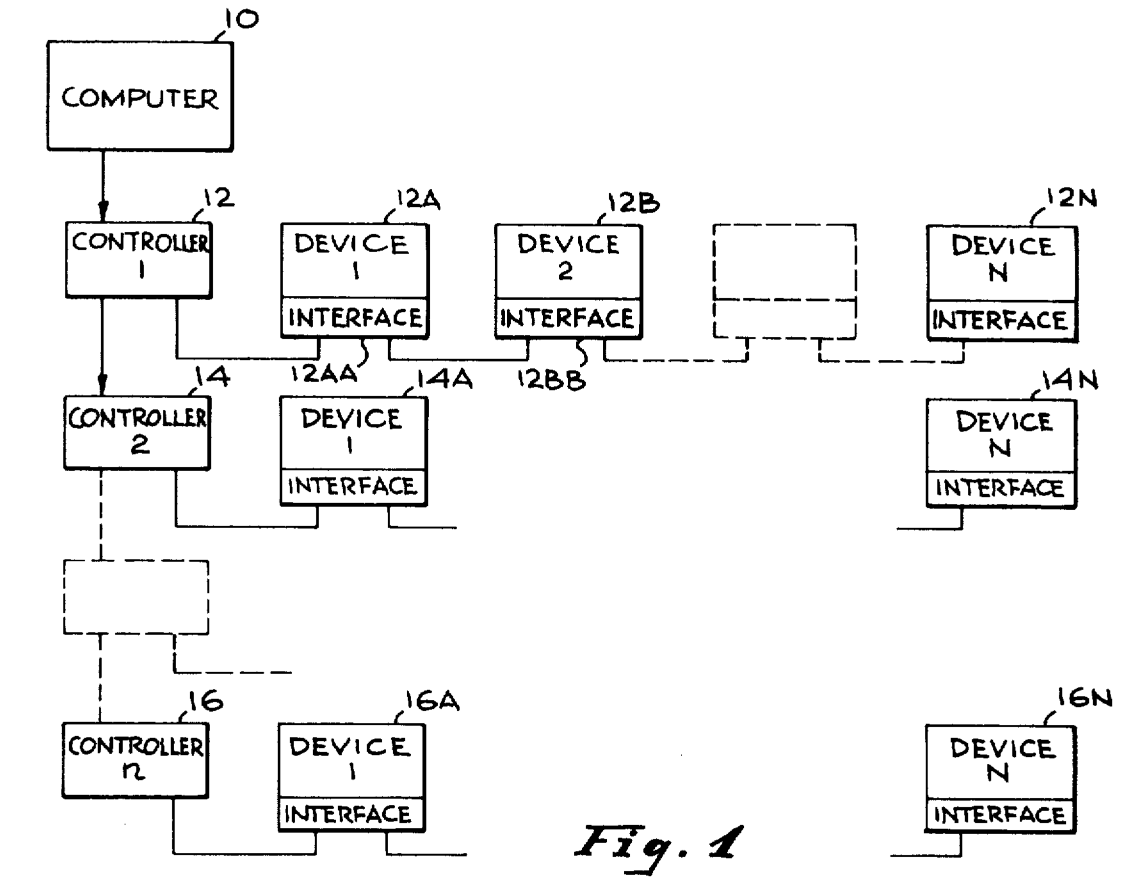
FIG. 1 is a block diagram illustrating the interconnection of a computer with a plurality of controllers, each of which is connected to a multiplicity of peripheral devices, when this invention is employed.

Referring now to FIG. 1, a computer 10 sends signals to and receives signals from a plurality of controllers, respectively 12, 14 and 16, representative of said plurality of controllers. Each controller in turn communicates with a plurality of devices respectively 12A, through 12N, 14A and 16A through 16N.

The computer may be any general purpose computer which has provision therein for storing the address of a controller and the address of a device coupled to that controller, with which the computer wishes to communicate. No unusual programming of the computer is required. It communicates with the peripheral devices and receives data from the peripheral devices by sending out instructions or requests and/or timing signals in addition to the address signals.

The controllers are all connected to receive all of the signals sent from the computer. The peripheral devices are connected in parallel to their associated controller and the respective controllers are connected in parallel to the computer I/O bus. Each device, as exemplified by device 12A has an interface circuit 12AA to which busses are connected from the controller. These busses then connect to the succeeding interface 12BB of the following device 12B. The signals sent down these busses, however, will only be accepted by the device which is addressed. The same busses also enable the peripheral devices to send signals back to the controller to which it is assigned. These signals are then transmitted to the computer.

Figure 2:
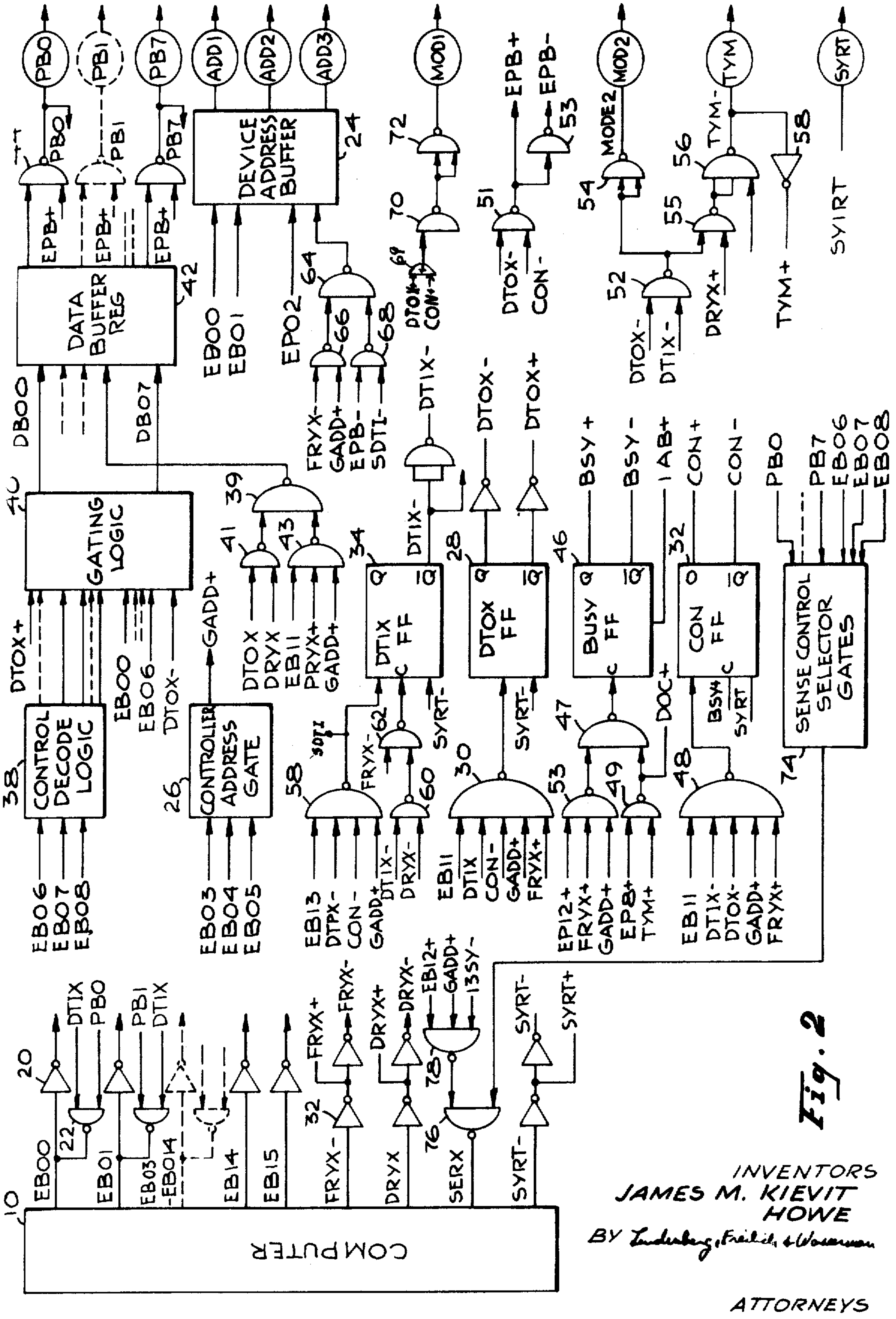
FIG. 2 is a block schematic diagram of the controller used in this invention.

FIG. 2 is a block schematic diagram of an exemplary embodiment of the controller used in this invention. Between the computer and the controller there are connected 16 lines designated from EB00 to EB15, and four additional dedicated lines designated as FRYX, DRYX, SERX, and SYRT. The lines EB00 to EB15 are used to transmit control codes, addresses and data from the computer to the controllers as well as from the controller to the computer. Thus, for signals leaving the computer an inverter 20, by way of example, is connected to the EB00 line. To bring signals into the computer, there is a NAND gate 22, having its output connected to the EB00 line. The input to the NAND gate comprises DTIX on one lead and PBO on the other. DTIX is a flip-flop output signal and PBO is the designation of the bus line connecting the controller to the devices. The meaning of these will become clear as this description progresses. The output of each of the lines EB00 through EB15 is identified by the same designation as that of the line.

For transmitting the address of the controller and the peripheral device communicating between controller and peripheral device, the computer busses EB00 through EB15 are used. Bits 0, 1 and 2 are used as a device address and are stored in a device address buffer 24. This may be a three bit register which has as three inputs EB00, EB01, and EB02. The remaining three bits which are applied from the EB03, EB04 and EB05 line are applied to the controller address gate 26, which decodes the address and, when it is the address of that controller, provides an output signal designated as GADD+. The presence of this signal is an indication of the selection of a particular controller by the computer. These address signals are maintained during the time that communication is sought between the computer and a peripheral device.

The computer "looks at" four control functions and there are lines dedicated to these control functions. A pulse designated as FRYX, just as the line nomenclature, is a pulse 200 nanoseconds wide and occurs at the commencement of an operation. The DRYX pulse which bears the same designation as the line on which it occurs, occurs during a data transfer out from the computer to the peripheral device and is 200 nanoseconds wide. Another DRYX pulse occurs on its line during the transfer of data into the computer of a peripheral device, and is 400 nanoseconds wide.

The SERX line is the means by which the controller can answer back to the computer. It answers either true or false to a specific device condition after being quizzed by a sense instruction from the computer. The SYRT line bears a reset pulse, also designated as SYRT, whenever it is desired to reset the system.

The lines EB06 to EB08 are applied to the control decode logic 38, which comprises any well known gating arrangement for energizing one out of eight output lines in accordance with the combinations of the energizations of the three input lines. The outputs from the control decode logic together with EB00 to EB06, and DTOX are applied to a "data gating logic" arrangement of gates 40, whose function it is to select either one of EB00 to EB06 or the output of one of the lines from the decode logic 38 and applies this to one out of eight output lines, designated as from DB00 to DB07. The lines are connected to a data buffer register 42. The data gating logic 40 circuit is a multiplexing circuit from transferring signals from one line to another. It does not convert data.

The data buffer register will not accept the output of the gating logic until it is enabled by the output of a NAND gate 39. This NAND gate receives as two required inputs the outputs of NAND gates 41 and 43. NAND gate 43 receives as its required inputs EB11, FRYX and GADD+. NAND gate 41 receives as its required inputs DTOX and DRYX.

The output of the data buffer registers are applied to the P bus lines, of which there are eight, which are designated from PB0 to PB7. These lines connect to the interface circuits of the various peripheral devices which are supplied from the controller. These P bus lines are two way lines and carry data to and from the peripheral devices. Each P bus line, for example, PB0, is connected to a correspondingly designated E bus line, for example EB00 through a NAND gate, such as 22. In this manner the peripheral device can send data back to the computer.

The data buffer registers connect to the P bus lines through NAND gates, for example, NAND gate 44, to the PB0 through PB7 bus lines. The second inputs to the NAND gates constitute an EPB+ signal. This is generated by a NAND gate having as its two required inputs DTOX− and CON− derived from the DTOX flip-flop 28 and the CON flip-flop 32. The CON flip-flop 32 is set with the following inputs, applied to a NAND gate 48. The inputs are EB11, DTIX−, DTOX−, GADD+, and FRYX+. The flip-flop 32 is reset when a busy flip-flop 46 supplies a signal to its clock pulse terminal or by a SYRT pulse.

The busy flip flop 46 is driven between set and reset states by inputs received from a NAND gate 47. The input to this NAND gate 47 are the output of a NAND gate 49 and another NAND gate 50. Normally, set and reset signals are provided by NAND gate 49 which has as its two inputs EPB+ and TMY+. It should be noted that the output of NAND gate 49 is called DOC+. A NAND gate 50 has EB12, FRYX+ and GADD+ applied, and serves to reset the busy flip-flop if, by the next sense request the peripheral device addressed has not responded. The EPB+ signal holds the busy flip-flop reset in the absence of a TYM+ signal. The TYM+ pulse is generated by DTOX− and DTIX− pulses being applied to a NAND gate 52, the output of which is applied to a NAND gate 55. The second input to NAND gate 55 is a DRYX+ pulse. The output of NAND gate 55 is applied to an inverter 56 to produce a TYM− pulse which is sent down on a TYM line to the peripheral devices. An inverter 58 connected to the TYM− line provides the TYM+ pulse.

The EPB+ signal is generated by applying DTOX− and CON− to a NAND gate 49 which produces EPB+ as its output. An inverter 53 provides an EPB− output.

Figure 6:
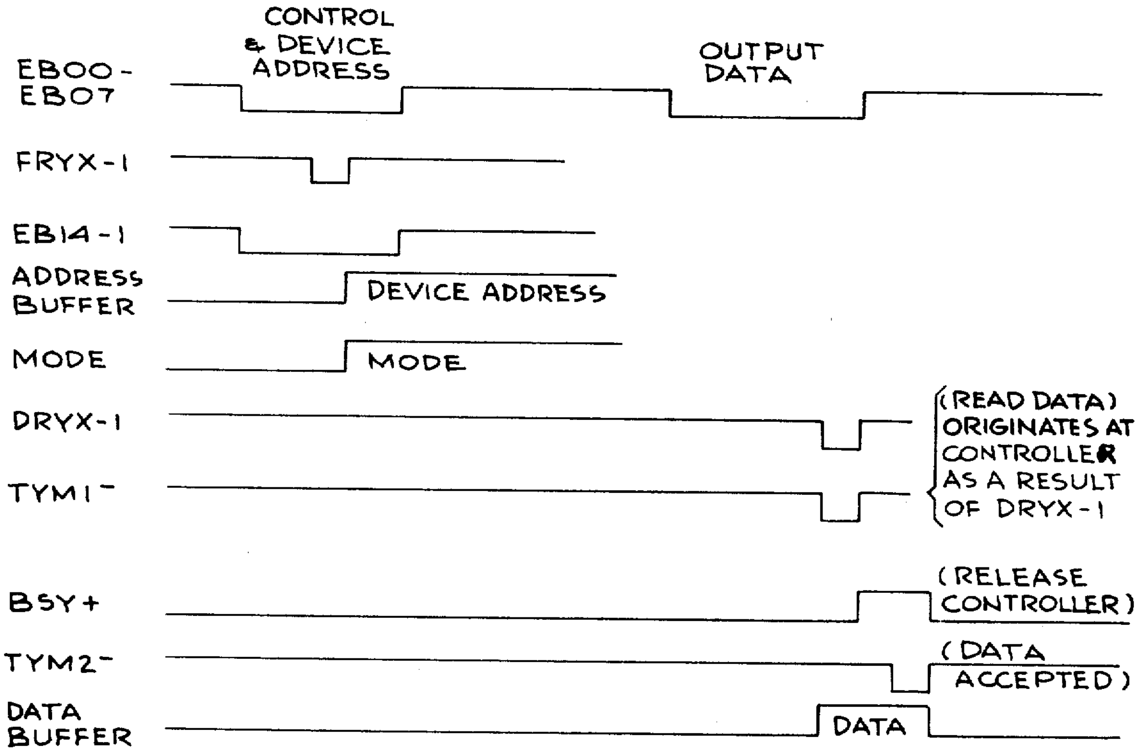

In the operation of transferring data out of the computer into a peripheral device, a flip-flop 28, designated as DTOX (data-transfer-out) is set, in response to the output of a signals NAND gate 30. The signals applied to the NAND gate are, FRYX+, generated by applying the FRYX− signal on the bus to an inverter 32. The GADD+ signal which is the output of the controller address gate 26. A CON− signal, which is received from a flip-flop 32. A DTIX− signal, which is received from a DTIX flip-flop 34, and an EB11 signal which is a positive pulse applied over the EB11 line from the computer. Thus, when a data transfer out of the compute is to occur, besides the address signals, the FRYX signal and the EB11 signal are sent from the computer. FIG. 6 shows the timing of these signals. The CON− and DTIX− signals are generated in the controller in a manner to be described. A SYRT− signal resets this flip-flop.

For data transfer into the computer the flip-flop 34 designated as DTIX (Data Transfer in) is set. This is accomplished by applying the following signals EB13, DTOX−, CON− and GADD+ to a NAND gate 58, whose output is applied to the set terminal of the DTIX flip-flop at the same time that DTIX− and DRYX are applied to a NAND gate 60, whose output is applied to a following NAND gate 62. The output of NAND gate 58 is also designated as SDTI. The other input to NAND gate 62 is FRYX−. The output of this NAND gate is applied to the clock terminal of the DTIX flip-flop. The DTIX+ signal enables the NAND gates, such as 22 whereby the data carried by the lines PB0–PB7 may be transferred to the EB00–EB07 lines and thereby into the computer.

The device address buffer 24 applies its address signals to three lines connected to the peripheral devices respectively designated as ADD1, ADD2, and ADD3. The device address buffer is enabled to load the address information in the presence of a signal from a NAND gate 64. One input to this NAND gate comprises the output of a NAND gate 66, which receives its two inputs FRYX+ and GADD+. The other input to NAND gate 64 is the output of a NAND gate 68, whose inputs comprise SDTI–, EPB–, and DTIX. SDTI is the output of NAND gate 58.

Mode 1 and mode 2 signals are indicative of what kinds of signals are being carried on the P bus lines connected between a controller and the peripheral devices designated. That is, the mode signals indicate to a peripheral device the interpretation to be given to the P bus signals. The mode 1 line receives input which comprises DTOX+ and CON+ which are applied to an OR gate 69. The OR gate output is applied to an inverter 70, whose output is applied for another inversion to a NAND gate 72. A mode 2 signal is derived by applying the output of the NAND gate 52 to a NAND gate 54 to be inverted. It will be recalled that NAND gate 52 provides an output in the presence of DTOX– and DTIX–.

When both mode lines represent a binary 0 then the peripheral device is receiving control commands over the P bus. When both mode lines represent a binary 1 then data is being sent from the device over the P bus. With mode 1 representing 0 and mode 2 representing 1, data is being transmitted to the bus. When mode 1 is 1 and mode 2 is 0 then inquiries are being made as to the device status.

The status of a peripheral device may be inquired into by the computer by establishing an FRYX–1 signal and an EB12 signal. The computer then places the address of the device whose status is desired plus the controller address on the EB00 through EB05 lines. Also, a function code signal is applied to the EB06 through EB08 lines. The function code, in the case of a sense instruction, tells the computer which peripheral device status line (PB0 to PB7) to look at. In FIG. 2, the sense control selector gates 74 have connected thereto lines PB0 through PB7 and EB06 through EB08. The sense control selector gates in response to the code provided over lines EB06 through EB08 enable one of the lines PB0 through PB7 to be connected to a NAND gate 76. The NAND gate has as its other input the output of a NAND gate 78, which has as required inputs EB12+, GADD+, and Busy–, (output of the busy flip-flop. NAND gate 78 is connected to the SERX line.

Thus, the true or false status of a chosen P bus line is fed back to the computer over the SERX line. The mode 1 and mode 2 signals, at this time indicate that the controller is in its device status mode.

Figure 3:
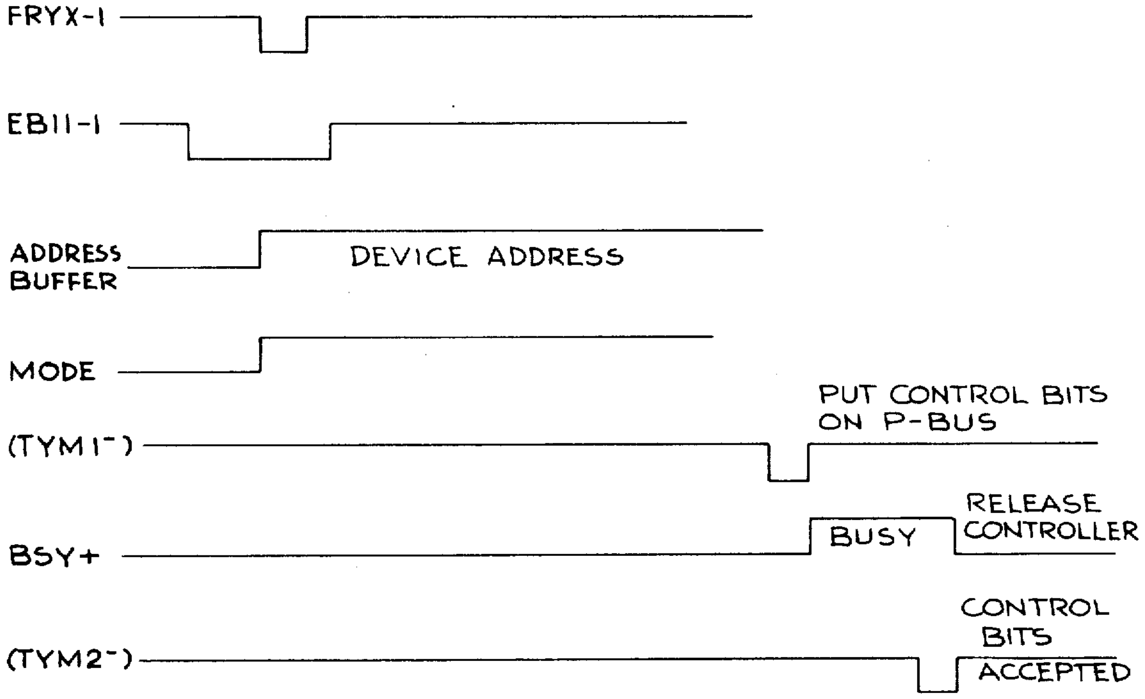
FIGS. 3, 4, 5 and 6 are timing diagrams shown to assist in an understanding of the sequence of operations occuring in the circuit of this invention.

FIG. 3 is a timing diagram showing the sequence followed when a control function mode operation (0,0) is to be performed. The negative going FRYX pulse occurs during the time that an EB11 pulse is on the EB11 line. At the time the FRYX pulse occurs, then address information comes up on EB00 to EB05 lines and control function mode information comes up on lines EB06 through EB08. This is decoded by the logic 38. Then whatever control function signal is to be transferred to a peripheral device is entered into the data buffer register through selector 40. The next signal that occurs is the TYM1 signal which is generated by NAND gates 52 and 54. The logic represented by gates 64, 66 and 68 which enables the address buffer 24, becomes operative at the time that the TYM signal is generated and thus the data buffer register is enabled to transfer its contents to the P bus at this time. The busy flip-flop is set at the termination of the TYM1 pulse and is reset at the termination of a TYM2 pulse. The TYM2 pulse is generated by the addressed peripheral device when it has accepted the control bit or bits, and is received over the TYM line. Resetting of the busy flip-flop releases the controller for another assignment.

Figure 4:
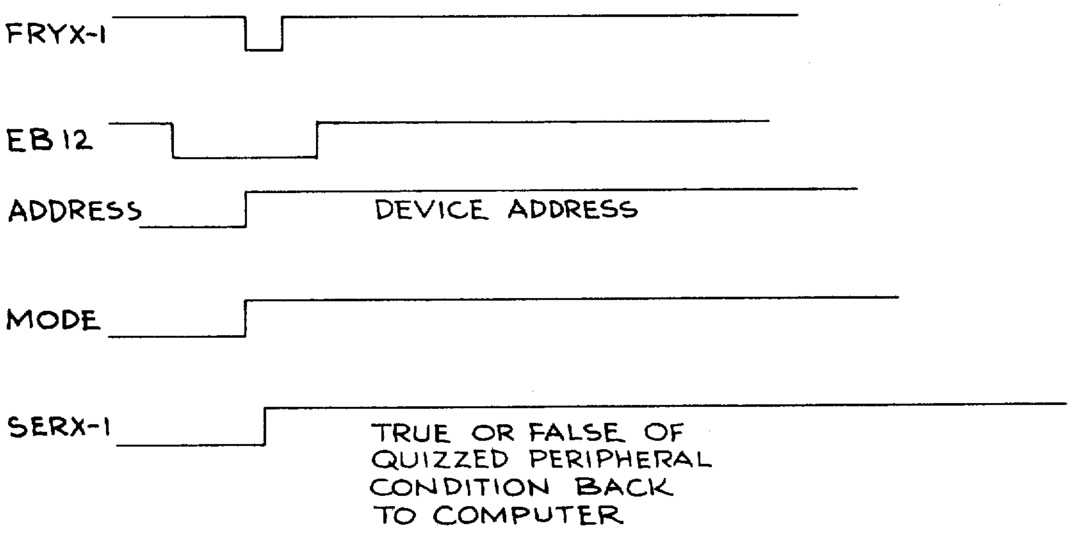

FIG. 4 is a timing diagram illustrating relations for the device status function mode, (1,0). A signal on line EB12 comes on first followed by the FRYX and then the device address signals. The mode signal occurs with the address signal. Shortly thereafter the SERX signal appears providing a reply to the computer of the condition of the peripheral device.

Figure 5:
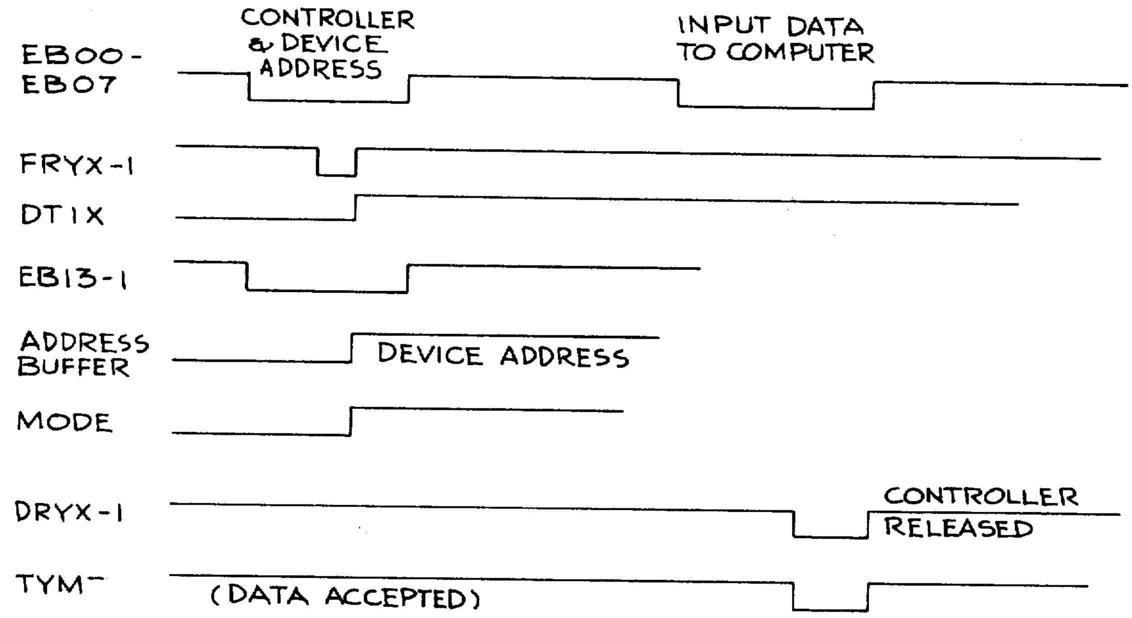

FIG. 5 indicates the timing arrangement for a data transfer to the computer from a peripheral device, (mode 1, 1). The mode 1 and mode 2 lines are respectively in their 11 states. The computer provides the peripheral equipment and the controller address which will participate in the data transfer. This occurs over lines EB00 to EB05, as previously indicated. During this time, EB13 provides a wide pulse to indicate that an input transfer command is in progress. The FRYX signal occurs during the middle of the EB13 signal. The trailing edge of the FRYX pulse sets the DTIX flip-flop. The mode control logic of the controller decodes the data transfer signals to generate the appropriate mode control signals to the peripheral device. The peripheral device which has been addressed will make the information requested available to the controller. The controller will acknowledge the receipt of the data with a timing pulse sent over the TYM line. The timing pulse occurs approximately identically with the DRYX pulse as generated when the data is accepted. The trailing edge of the DRYX pulse releases the controller for its next operation.

FIG. 6 is a timing diagram illustrating the sequence of events for a data transfer from the computer to the addressed peripheral device (mode 0,1). Initially, the controller and device address are established. A control signal comes up on the EB14 line to indicate that an output data transfer is being executed. The FRYX pulse comes on and the trailing edge of this pulse sets the DTOX flip-flop. The FRYX pulse also clocks the device address into an address holding buffer in the controller. The occurrence of a DTOX flip-flop output serves to enable the gating logic 40 to apply the data represented by the signals on the E bus lines (EB00 through EB06) to the input of the data store buffers. This signal also sets the busy flip-flop 46.

The mode control logic of the controller uses data transfer signals to generate the appropriate mode signals to the peripheral device via the P bus. In this case mode 1 is a logical 0 and mode 2 is a logical 1, which is a data transfer OUT function.

The occurrence of the DRYX pulse enables the data buffer registers 42 to enter the data which is applied to their inputs from the gating logic. The DRYX pulse also generates a TYM pulse via NAND gate 54. The TYM pulse is applied to the peripheral device and enables it to strobe the information being applied to the PB0 to PB7 lines into an input register in the peripheral device. At this time the peripheral device generates a TYM 2 pulse which is returned over the TYM line and serves to reset the busy flip-flop releasing the controller.

Figure 7:
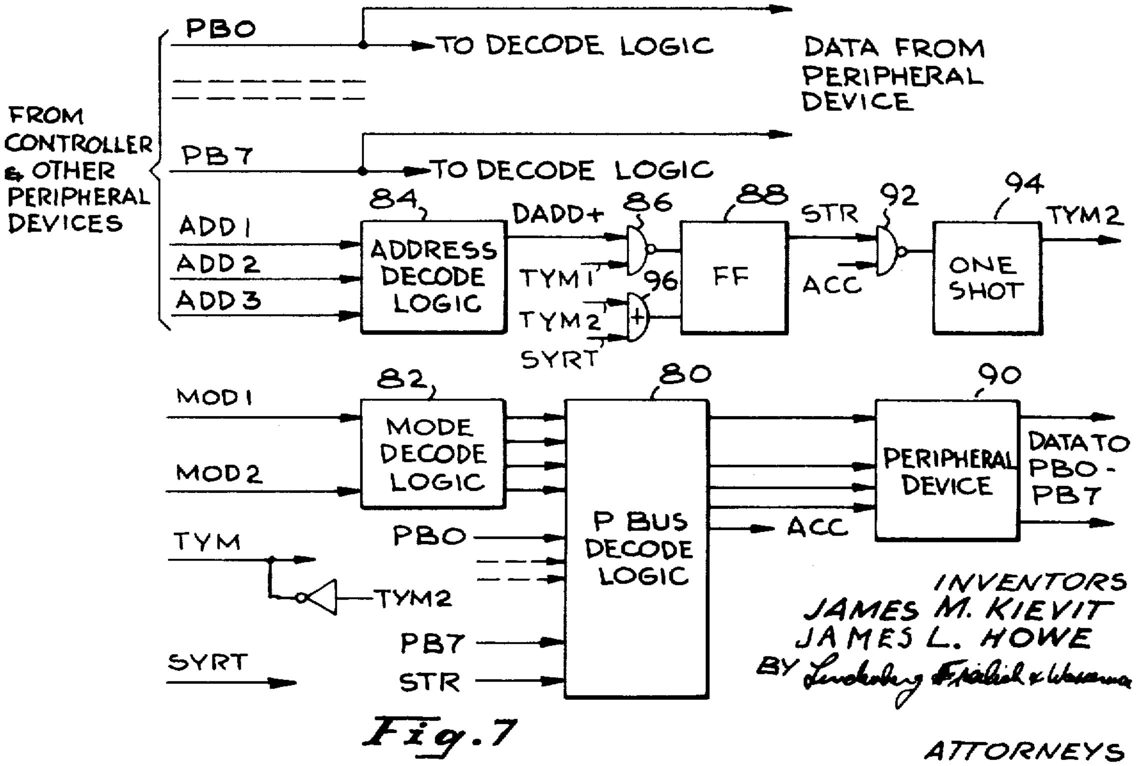
FIG. 7 is a block schematic diagram of an interface circuit in accordance with this invention.

FIG. 7 is a block schematic diagram illustrative of the interface equipment provided each peripheral device. All the bus lines emanating from the controller are connected to the interface equipment for each peripheral device assigned to that controller. Using the PB0 bus as illustrative, it and PB1 through PB7 busses are connected to P bus decode logic 80. Also connected to P bus decode logic 80 is the output of mode decode logic 82, to which the mode 1 and mode 2 lines are connected. The mode decode logic signals are converted to a signal on one of four lines which indicates the nature of the P bus signals. This is used by the P bus decode logic for interpreting the signals on the P bus.

Before the P bus decode logic can operate upon the signals applied to its inputs an STR signal is required. Address decode logic circuits 84 to which the ADD1 through three lines are applied, provides an output designated as DADD, only if the address on the incoming address lines is the address of that peripheral device, as established by the decode logic. The DADD signal is applied to a NOR gate 86, whose other required input is a TYM1 signal from the TYM lines. When this occurs, a flip-flop 88 is set providing at its output the STR signal which enables the P bus decode logic to proceed. It decodes the signals applied to its input and transmits them to the peripheral device 90, which then proceeds to operate in accordance with these signals. The STR output from flip-flop 88 is also applied to a NAND gate 92. The other require input of this NAND gate is an ACC signal. The ACC signal is applied from the P bus decode logic and indicates a correct parity check. The NAND gate 92 output is applied to a one-shot circuit 94. The one-shot provides the required TYM 2 pulse which is sent back to the controller over the TYM line.

The SYRT reset signal or the TM2 pulse can reset the flip-flop 88 through an OR gate 96.

In the event that the peripheral device 90 is requested to send back data to the computer via the controller, then the mode decode logic together with the instruction on the P bus indicates this fact. The P bus decode logic then causes the peripheral device to enter into a "data return" mode. The peripheral device applies the data over the PB0 through PB7 lines by means of which they are returned to the controller.

There accordingly has been described hereinabove a novel and useful arrangement for enabling a computer to communicate efficiently with a larger peripheral device.

What is claimed is:

1. In a system wherein a computer communicates with a number of peripheral devices, the improvement comprising:

a plurality of controller circuits, a separate plurality of peripheral devices assigned to each controller circuit, means coupling all of said controller circuits to said computer, means coupling each separate plurality of peripheral devices to its assigned controller circuit, first address logic means in each controller for enabling a controller to become operative in response to a unique controller address signal, second address logic means at each peripheral device for enabling it to become operative in response to a unique peripheral device address signal, means for transmitting digital signals and first and second address signals from said computer to said controllers, means in a controller rendered operative responsive to its unique first address signal to store and process said second address and digital signals, means to transmit to all of its associated peripheral devices said stored and processed second address and said digital signals, and means in a peripheral device rendered operative responsive to its unique second address signal to respond to said digital signals.

2. In a system as recited in claim 1 wherein said means in a controller rendered operative responsive to its unique first address signal to store and process said second address and digital signals includes means responsive to signals from said computer for generating mode signals indicative of the nature of said digital signals, means in an operative controller for transmitting said mode signals to all of the peripheral devices associated therewith, and means in an operative peripheral device for utilizing said mode signals for decoding said digital signals.

3. In a system as recited in claim 2 wherein said mode signals represent that said digital signals are representative of a command, said controller includes means for converting said digital signals into command signals for said operative peripheral device, and means for transmitting said command signals to said peripheral devices in place of said digital signals.

4. In a system as recited in claim 2 wherein said mode signals represent that said digital signals are inquiring as to the status of an addressed operative peripheral device, said addressed operative peripheral device includes means responsive to said mode and digital signals for transmitting to said operative control device signals representative of the status of said addressed operative peripheral device, and said operative control device includes means for transmitting said signals representative of the status of said peripheral device to said computer.

5. In a system as recited in claim 2 wherein said mode signals represent that said digital signals represent a request for data from an addressed operative peripheral device, said addressed operative peripheral device includes means responsive to said mode and digital signals for transmitting requested data to said operative control device, and said operative control device includes means for transmitting said requested data to said computer.

6. In a system wherein a computer communicates with a number of peripheral devices, the improvement comprising:

a plurality of controller circuits, a separate plurality of peripheral devices assigned to each controller circuit, means coupling all of said controller circuits to said computer, means coupling each separate plurality of peripheral devices to its assigned controller circuit, first address logic means in each controller for enabling a controller to become operative in response to a unique controller address signal, second unique address logic means at each peripheral device for enabling it to become operative in response to a unique peripheral device address signal, means for transmitting data and first and second address signals from said computer to said controllers, means at each controller for storing said data and said second address signals responsive to a controller being rendered operative in response to said first address signals, means for applying said stored data and said device address from the respective storage means to said means coupling said plurality of devices to its assigned controller, means at an operative controller for generating a timing signal, means for transmitting said timing signal to all of the peripheral devices assigned to said controller, means at an operative peripheral device for enabling decoding of said data signals responsive to a correct address and said timing signal, means for generating a second timing signal at an operative peripheral device responsive to a first timing signal and the decoding of said data signals, means for transmitting said second timing signal back to said controller associated with said peripheral device, and means at said controller for deenergizing said controller responsive to said second timing signal.

7. Apparatus as recited in claim 6, wherein each controller includes means for generating mode signals indicative of the nature of the data signals stored in said data storage, and means for transmitting said mode signals to said energized peripheral device for use in decoding said data signals.

8. Apparatus as recited in claim 6 wherein there is included a busy flip-flop means responsive to the energization of said controller for providing a busy signal to said computer, and means for applying said second timing signal to said busy flip-flop means to reset it.

9. Apparatus as recited in claim 7 wherein each energized peripheral device includes means responsive to mode and data signals for transmitting data signals to its associated controller, and said associated controller includes means for transmitting the data signals received from said energized peripheral device to said computer.

* * * * *